United States Patent [19]
Meltzer

[11] 3,882,127
[45] May 6, 1975

[54] 17-ALKENYL-6β-AZIDO-4,5α-EPOXYMORPHINAN-3-OLS

[75] Inventor: Robert I. Meltzer, Rockaway, N.J.

[73] Assignee: Warner-Lambert Company, Morris Plains, N.J.

[22] Filed: Aug. 31, 1973

[21] Appl. No.: 393,379

[52] U.S. Cl.................................. 260/285; 424/260
[51] Int. Cl.............................................. C07d 43/28
[58] Field of Search................................... 260/285

[56] References Cited
UNITED STATES PATENTS
3,318,885  5/1967  Brown et al. ................. 260/285

OTHER PUBLICATIONS

Bognar et al., Chemical Abstracts, Vol. 71, 13243x, 1969.

Bognar et al., Chemical Abstracts Vol. 71, 3515y, 1969.

*Primary Examiner*—Donald G. Daus
*Assistant Examiner*—Mary C. Vaughn
*Attorney, Agent, or Firm*—Albert H. Graddis; Frank S. Chow

[57] ABSTRACT

The present invention relates to novel 17-alkenyl-6β-azido-4,5α-epoxymorphinan-3-ols having the following structural formula:

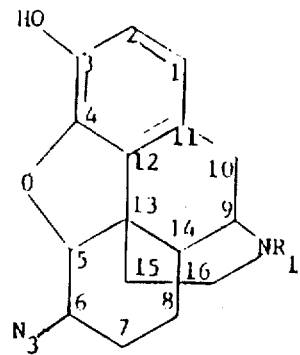

in which $R_1$ is alkenyl such as, for example, allyl. These compounds are useful as analgesics.

2 Claims, No Drawings

17-ALKENYL-6β-AZIDO-4,5α-EPOXYMORPHI-NAN-3-OLS

The present invention relates to novel morphine derivatives and, more particularly, the present invention relates to 17-alkenyl-6β-azido-4,5α-epoxymorphinan-3-ols having the following structural formula:

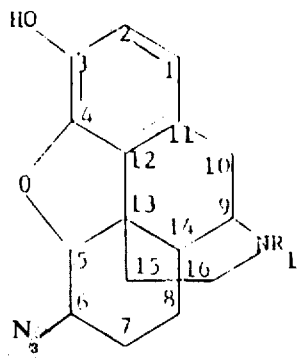

wherein $R_1$ is alkenyl having 3–8 carbon atoms, e.g., allyl.

The present invention also includes within its scope pharmaceutically acceptable acid addition salts of these novel azidomorphine derivatives.

The compounds of this invention are useful as analgesics and antitussives. They are administered parenterally or orally for the management of pain in any of the usual pharmaceutical forms including tablets, capsules, powders, suspensions, solutions, syrups and the like. Particularly valuable formulations include sustained release preparations which may be compounded by any of the known procedures. Generally these compounds are effective in effecting analgesia at a dosage of from about 0.1 to about 0.5 mg. per kg. of body weight. As with any analgesic agent, the dosage should be adjusted to the severity of the indication and the degree of response. Moreover the dose may be repeated as appropriate depending upon the nature of the particular formulation, the response and the condition of the patient.

According to the present invention the above compounds are prepared by acylating 17-$R_1$-4,5α-epoxymorphinan-3,6α-diol. The acylated product is treated with tosylchloride to give the corresponding 6α-tosyloxymorphinan derivative. Treatment of the tosyl derivative with sodium azide yields the desired compounds of this invention.

The starting compound is disclosed in U.S. Pat. No. 2,741,612.

In order to further illustrate the practice of this invention, the following examples are included:

EXAMPLE 1

Preparation of 3-Acetoxy-17-allyl-4,5α-epoxymorphinan-6α-ol

To 7.4 g of 17-allyl-4,5α-epoxymorphinan-3,6α-diol in 1200 ml water is added 120 g of sodium bicarbonate followed by four successive additions of 15 ml of acetic anhydride. After 30 minutes, the mixture is extracted with four 500 ml portions of chloroform. The combined extracts are dried, filtered and evaporated to give 9.0 g of oil.

EXAMPLE 2

Preparation of 3-Acetoxy-17-allyl-4,5α-epoxy-6α-tosyloxymorphinan

To a solution of 8.7 g of 3-acetoxy-17-allyl-4,5α-epoxymorphinan-6α-ol in 40 ml pyridine is added dropwise a solution of 7.5 g tosyl chloride in 40 ml pyridine over 20 minutes maintaining a temperature of −5°C. After 1 hour at 0°C and 16 hours at 25°C the bulk of pyridine is removed under vacuum. Then 400 ml of 5 percent sodium bicarbonate is added and the mixture extracted with three 500 ml portions of ether. The combined extracts are washed, dried, filtered and evaporated. The residue is dissolved in 20 ml ethanol and 4.4. g of tartaric acid in 20 ml ethanol are added. The tartrate is precipitated by adding benzene, filtered, redissolved in a minimum of ethanol and reprecipitated with petroleum ether to 8.8 g. This is stirred in 30 ml hot water, filtered hot and the cake washed with ethanol, tetrahydrofuran and petroleum ether to give 4.7 g, mp 111°–114°C. The elemental assay conforms to a dihydrate of the tartrate salt of the above compound.

Calcd. for $C_{32}H_{37}NO_{12}S \cdot 2H_2O$: C, 55.25; H, 5.94; N, 2.01; S, 4.61.

Found: C, 55.05; H, 5.75; N, 2.02; S, 4.51.

EXAMPLE 3

Preparation of 17-Allyl-6β-azido-4,5α-epoxymorphinan-3-ol

The free base from 4.5 g of 3-acetoxy-17-allyl-4,5α-epoxy-6α-tosyloxymorphinan tartrate dihydrate is isolated by treating with aqueous ammonia extracting into chloroform and evaporating to a residual oil. This residue is heated 24 hours at 100°C with 108 ml dimethylformamide, 6.8 g of sodium azide and 16 ml of water. The mixture is cooled, poured into water and extracted into ether. The ether extracts are washed with water, dried over sodium sulfate and evaporated. The residue is recrystallized from ether to give 600 mg, mp 133°C. The infrared shows a strong band at 2090 cm$^{-1}$. $[\alpha]^{25}_D = -171.0$ (C=1 in MeOH).

Calcd. for $C_{19}H_{22}N_4O_2$: C, 67.43; H, 6.55; N, 16.56.
Found: C, 67.20; H. 6.716.71 ; N, 16.65.

I claim:
1. A compound of the formula:

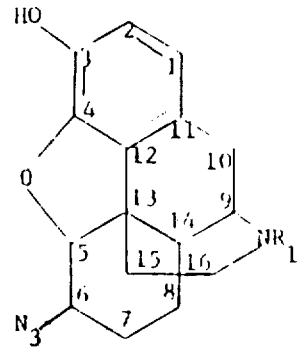

wherein $R_1$ is alkenyl having 3 to 8 carbon atoms and the pharmaceutically acceptable acid addition salts.

2. A compound according to claim 1 wherein said alkenyl is allyl.

* * * * *